April 29, 1958     G. E. COMSTOCK 3D     2,832,652
JOURNAL BEARING
Filed Nov. 7, 1955
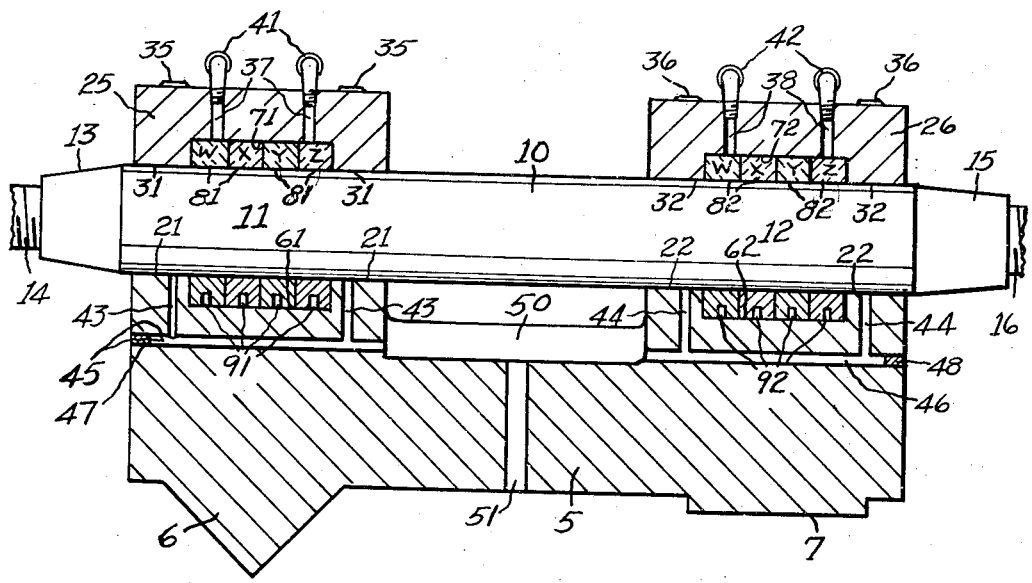
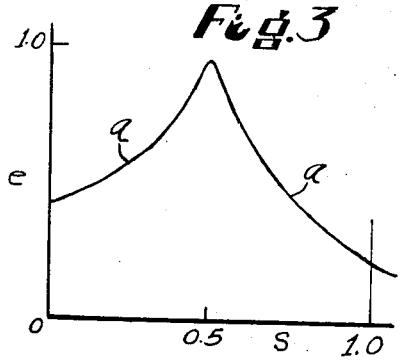
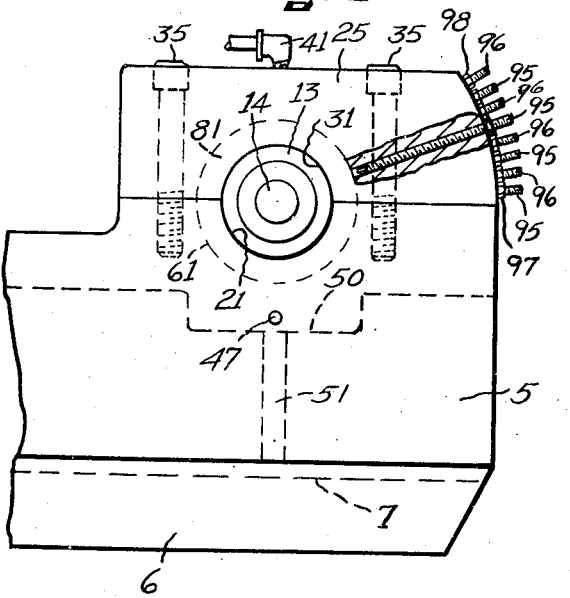
INVENTOR
GEORGE E. COMSTOCK 3rd.
ATTORNEY

2,832,652

JOURNAL BEARING

George E. Comstock 3d, Princeton, Mass., assignor to Norton Company, Worcester, Mass., a corporation of Massachusetts Application November 7, 1955, Serial No. 545,419

2 Claims. (Cl. 308—121)

The invention relates to journal bearings.

One object of the invention is to provide a journal bearing which exhibits very little deflection under loading forces. Another object of the invention is to provide a journal bearing which responds only slightly to varying loading forces. Another object of the invention is to provide a journal bearing which supports with little deflection loading forces of any frequency. Another object of the invention is to reduce vibration of a journal. Another object is to reduce vibration of a spindle. Another object is to provide an improved spindle bearing for many practical uses. Another object is to provide an improved spindle bearing for grinding machines. Another object is to reduce or to eliminate chatter marks produced by grinding operations. Another object of the invention is to prevent loss of load capacity in a journal bearing. Another object is to provide a journal bearing construction which minimizes oil film whirl.

Other objects will be in part obvious or in part pointed out hereinafter.

In the accompanying drawings illustrating one of many possible embodiments of the invention, Figure 1 is a vertical sectional view of a spindle having two journal portions each one mounted in a bearing according to the invention, the bearings being on the cross slide of a grinding machine, Figure 2 is a side elevation taken from the left side of Figure 1, Figures 3 and 4 are graphs illustrating the operation of the invention.

Referring to Figure 1, a cross slide 5 has a V-way 6 and a flatway 7 for engagement with complementary surfaces provided on the base of the machine. Mounted on this cross slide is a grinding wheel spindle 10. The spindle 10 has journal portions 11 and 12. At one end of the spindle 10 is a tapered portion 13 merging into a threaded terminal portion 14. The tapered portion 13 is for the mounting of a flange holding a grinding wheel and the threaded portion 14 receives a nut to secure the grinding wheel flange and thus the grinding wheel to the spindle 10. At the other end of the spindle 10 is a tapered portion 15 merging into a threaded portion 16. The tapered portion 15 is for the mounting of a pulley which is secured in place by a nut on the threaded portion 16.

Formed in the slide 5, which may be a piece of cast iron, are half bearings 21 and 22. The spindle 10 is assumed to be made of steel as grinding wheel spindles are practically always made of steel. A steel journal runs pretty well in a cast iron bearing. A pair of cast iron bearing caps 25 and 26 have half bearings 31 and 32. The bearing caps 25 and 26 are secured to the wheel slide 5 by means of bolts 35 and 36. Vertical oil holes 37 and 38 are drilled in the bearing caps 25 and 26 and suitable piping directs oil to these oil holes the last part of the piping being the elbows 41 and 42 shown. Vertical oil holes 43 and 44 are drilled from the half bearings 21 and 22 downwardly to horizontal oil holes 45 and 46 which are plugged by plugs 47 and 48 on the outside but lead to a recess 50 between the half bearings 21 and 22 and the oil drains downwardly through a vertical oil hole 51 into the base of the machine.

Everything so far described is conventional and can be varied without limit. A very simple journal bearing combination has been described and it will be understood that much more complicated arrangements are usually preferred but a description of any particular complex bearing would only serve to obscure the present invention. It is assumed that in many cases bearing inserts will be provided so that the bearings will be of some material other than cast iron, for example bronze or babbitt.

Coming now to the gist of the present invention, formed in the half bearings 21 and 22 are half annular recesses 61 and 62 and formed in the half bearings 31 and 32 are half annular recesses 71 and 72. The two half annular recesses 61 and 71 make a complete annular recess and the two half annular recesses 62 and 72 make a complete annular recess. In this annular recess formed out of the half annular recesses 61 and 71 is a ring 81 and in the annular recess formed out of the half annular recesses 62 and 72 is a ring 82.

It is well known that the shaft of a journal bearing may, under certain conditions such as large clearance, light load, and high speed properly combined, exhibit an eccentric movement within its clearance space at a speed of approximately one-half its rotational speed. This phenomenon is called oil film whirl. A related phenomenon is the loss in load capacity of a journal bearing for dynamic loads having frequencies approaching one-half shaft rotation frequency. If eccentricity ratio $e$ is the vertical coordinate and speed ratio $s$ is the horizontal coordinate, the curve $a$ may be about as shown in Figure 3. For disturbing force frequencies in the vicinity of a whirl frequency, the eccentricity attains very nearly its possible maximum value of 1.0 which represents the metal to metal zero clearance condition. This response is very similar to the simple resonance curve of a single degree of freedom mechanical resonator, although it differs significantly in that the resonant frequency is determined almost solely by shaft speed rather than by the usual mass-spring constant ratio.

Eccentricity ratio may be defined as the displacement of the journal axis from the bearing axis divided by the radial clearance between journal and bearing when the axes are coincident. Speed ratio may be defined as the number of repetitions per unit time of a cyclically repeating loading force divided by the number of revolutions of the journal in the same time unit. The whirl frequency is the rate at which the journal executes a circular eccentric movement at one-half spindle rotation speed.

In the case of a high precision machine tool spindle such as that of a grinder, a "soft" response to relatively low frequency disturbing forces is undesirable. A more or less continuous noise spectrum is created by the grinding contact force, with the result that excitation of the resonant mode of spindle bearing oscillation is likely to occur. Movement of the wheel results in a wavy surface pattern on the workpiece, which wavy surface on subsequent passes under the wheel may serve further to augment the pattern created by the disturbing force, resulting in a gradual building up of the oscillation amplitude and the production of a "chatter" surface on the workpiece.

This invention eliminates or reduces these effects by the provision of an anti-resonant construction. The rings 81 and 82 are free to rotate both upon the journals 11 and 12 and within the bearings 21—31 and 22—32. In a typical case the spindle 10 may have a diameter of three inches, the bearings may each have an overall length of seven inches, the bearing areas on either side of the rings 81 and 82 being each one and one-half inches long and the rings being therefore four inches long. The clearance between the journals 11 and 12 and the bearings 21 and 22 may be in such case .001 inch and in such case the rings 81 and 82 may have a clearance of .00075 inch radially from the bottom of the recesses 61—71, 62—72 and also radially from the journals 11 and 12.

When the spindle 10 is brought up to speed, for example 850 R. P. M., the rings 81 and 82 are rotated with it by the viscous drag of the oil in the clearance space between the journals 11 and 12 and the rings 81 and 82. However, the rings 81 and 82 are retarded by a similar viscous drag of the oil between them and the metal at the bottom of the recesses 61—71, 62—72. Thus the rings 81 and 82 will rotate at a speed less than that of the spindle 10, for example at about one-half spindle speed, or 425 R. P. M. Therefore the resonance curve of the spindle in its bearings 21—31, 22—32 peaks at about one-half spindle speed, but the resonance curve of the spindle and ring combination peaks at about one-quarter of the spindle speed.

In Figure 4 where again the vertical coordinate $e$ is the eccentricity ratio and the horizontal coordinate $s$ is the speed ratio, curve $a$ shows the response of the journal-bearing portion, and curve $b$ is the response of the journal-ring-bearing portion, curves $a$ and $b$ having been plotted on the assumption that the static load response of the two portions is equal, and that the rotational speed of rings 81—82 is one-half of spindle speed. It may be seen that when the disturbing force has a frequency of approximately one-quarter of spindle speed, that is coordinate $s$ is approximately equal to 0.25, then the journal-ring-bearing portion exemplified by curve $b$ would experience a large eccentric displacement but for the fact that the journal-bearing portion exemplified by curve $a$ is much stiffer under these loading conditions, with the result that the latter portion carries nearly all the loading force. Similarly if the frequency of the loading force is at one-half spindle speed, that is parameter $s$ equals 0.5, then the journal-bearing portion exhibits a soft response, and most of the load is carried by the journal-ring-bearing portion. Thus at $s$ equals 0.25 and 0.50 the composite response is approximately equal to the response at these points of curves $a$ and $b$ respectively, whereas for all other values of $s$ both portions exhibit greater load carrying capacity than at their respective peaks, and therefore the composite response is a smaller eccentricity value than for either curve $a$ or $b$ alone, resulting in the net response shown in curve $c$.

The clearance spaces in this journal bearing, meaning between the journals 11 and 12, and the bearings 21—31, 22—32 as well as the clearances between rings 81 and 82 and these journals and also between these rings and the recesses 61—71, 62—72, all measured radially, as well as the axial lengths of the bearings and rings are all of them functions of the desired load carrying capacity of the journal-bearing combination on the one hand and of the journal-ring-bearing combination on the other hand, for the recesses 61—71, 62—72 are bearings. Preferably the load carrying capacities of the journal bearing and the journal ring bearing should be nearly equal.

The load carrying capacity in absolute terms of a journal bearing is a complicated function of the relative speed of journal and bearing, the clearance between journal and bearing, the length of the bearing, and the viscosity of the lubricating fluid (which in most cases is strongly dependent upon the temperature of the fluid, which in turn is affected by the frictional losses within the bearing), the characteristics of the journal bearing combination relative to end leakage of lubricating fluid, and to the means chosen for supplying lubricating fluid to the journal bearing. Therefore the best I can do is to give an example of specific parameters which are satisfactory.

Reference has been made to the rings 81 and 82 as if they were single rings. In many cases this construction will be quite satisfactory. However, in many applications conditions vary from time to time. This is true of spindles for grinding machines. Also since the parameters are difficult to arrive at, in cases where only a few machines of a given type are to be constructed, it will be simpler to provide for adjustment to obtain nearly optimum conditions thereby rather than to rely upon mathematical calculations for the parameters since the calculations are difficult due to so many variables. Therefore in one form of the invention which is for most applications the preferred form, each of the rings 81 and 82 is split into several parts side by side labeled $w$, $x$, $y$ and $z$ in Figure 1. Thus Figure 1 discloses four rings 81 of equal size and four rings 82 of equal size. However, fewer or many more than four rings could be provided for each journal bearing and they would not have to be of the same size.

I provide holes 91 and 92 extending radially inward into the several ring parts $w$, $x$, $y$ and $z$. These holes need not extend completely through the ring parts although they might do so. Figure 1 shows an alignment which would rarely be the case but it is easier to depict them that way. Referring to Figure 2, I further provide screws 95 and 96 extending into threaded holes in the caps 25 and 26, there being one screw 95 or 96 for each of the holes 91 and 92. The ends of the screws 95 and 96 are unthreaded and of significantly less diameter than that of the holes 91 and 92. By screwing in one or more of the screws 95 and 96 particular ring parts can be stopped. To engage a screw 95 or 96 in a hole 91 or 92, the spindle can be turned by power and the screw slowly advanced. Presently through the screw driver the operator will feel a clicking and then he should turn the screw very slowly and eventually it will enter. Then the screw should be turned one more turn and locked with a lock nut 97 or 98.

Thus if it is contemplated that a ring the size of $x$ and $y$ combined is adequate, the parts $w$ and $z$ can be stopped but if later on experience shows that the ring should be larger, $w$ can be released and if further experience shows that the ring should be still larger, $z$ can be released. If on the other hand experience shows that the ring is too large, $x$ or $y$ can be stopped. This provides for a large range of adjustments and still larger ranges of adjustments can be provided by providing more ring parts. It will be noted that the ends of the screws 95 and 96 are not tapered except possibly at the very tip so that there will be no resultant force upon any ring part pressing it inwardly or outwardly. The screws 95 and 96 constitute restraining means for stopping the ring parts.

It will thus be seen that there has been provided by this invention a journal bearing in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A journal bearing comprising a relatively stationary bearing, a journal nicely fitting said bearing within it with oil clearance between them, said bearing having an annular recess and said recess having a bearing surface, a rotatable ring in said annular recess nicely fitting said bearing surface with oil clearance between them, said ring having an inner bearing surface, said journal being inside of said ring and nicely fitting said ring with oil clearance between them, said ring being a multi-part ring and means optionally to restrain a part of said multi-part ring from rotation and optionally to allow said part to rotate.

2. A journal bearing according to claim 1 having means to restrain a plurality of parts of the ring from rotation and optionally to allow them to rotate, said means being selective to restrain a part of the ring and to allow another part of the ring to rotate.

References Cited in the file of this patent

UNITED STATES PATENTS

| | | |
|---|---|---|
| 150,561 | Garton | May 5, 1874 |
| 378,978 | Ryan | Mar. 6, 1888 |
| 901,866 | Atkinson | Oct. 20, 1908 |